United States Patent Office 2,698,297
Patented Dec. 28, 1954

2,698,297

GREASE COMPOSITIONS CONTAINING SYNTHETIC GELLING AGENTS

John J. Giammaria, Woodbury, N. J., assignor to Socony-Vacuum Oil Company, Incorporated, a corporation of New York No Drawing. Application September 27, 1952, Serial No. 311,960

19 Claims. (Cl. 252—33.6)

The present invention has to do with grease compositions and, more specifically, has to do with grease compositions containing metal salts of reaction products obtained by reaction of alcohols or amines with acidic copolymers of alpha, beta unsaturated polycarboxylic acids or their anhydrides with low molecular weight compounds having a terminal vinyl group ($-CH=CH_2$).

This application is a continuation-in-part of application Serial No. 215,859, filed March 15, 1951. In said application, description was made of a novel group of grease compositions, namely, greases containing metal salts of acidic copolymers of said acids or anhydrides with certain aliphatic compounds having a terminal vinyl group. The aliphatic compounds used in preparing said copolymers are alpha olefins, $R-CH=CH_2$, and allyl esters, $RCOOCH_2CH=CH_2$, in both of which R is an alkyl group having at least 10 and up to 30 carbon atoms. Coupled with this discovery is the related discovery that when low molecular weight vinyl compounds, such as propylene, styrene, vinyl acetate and the like, are copolymerized with the aforesaid acids or anhydrides, and the copolymers (I) thereof are, in turn, converted to their corresponding metal salts or soaps, the soaps are too insoluble for use as grease gelling agents. Now, however, it has been further discovered that said copolymers (I) can be reacted with certain alcohols or amines, and the reaction products thus obtained can be converted into metal soaps which are gelling agents of excellent character.

It is an object of this invention, therefore, to provide soaps of partial esters and partial amides of acidic copolymers of low molecular weight vinyl compounds and of said alpha, beta unsaturated polycarboxylic acids. It is also an object of this invention to provide greases capable of withstanding severe operating conditions. It is also an object to provide greases effective for high temperature use, such as at 250–350° F. and higher. Other objects will be apparent from the following description:

I. ACIDIC COPOLYMERS

A. VINYL COMPOUNDS

The vinyl compounds which can be used to form the acidic copolymers with the alpha, beta unsaturated polycarboxylic acids, are: aliphatic alpha olefins; allyl esters of aliphatic acids; allyl ethers of aliphatic alcohols; vinyl esters of aliphatic acids and vinyl ethers of aliphatic alcohols; and vinyl-substituted aromatic hydrocarbons. In particular, compounds of the general formula, $$CH_2=CH-R_1$$

wherein R, is hydrogen or an aryl, aralkyl, alkyl, alkaryl, cycloalkyl, ester or ether group, containing less than about ten carbon atoms, and compounds of the general formula $H_2C=CH-CH_2-R_1$, wherein $R_1$ is as described above, can be used herein. In general, the vinyl compounds have molecular weights of less than about 200. Typical of such compounds are: styrene, vinyl toluene, vinyl naphthalene, ethylene, propylene, butylene, isobutylene, 1-octene, vinyl acetate, vinyl butyrate, vinyl 2-ethylhexoate, vinyl methyl ether, vinyl butyl ether, vinyl octyl ether, allyl acetate, allyl butyrate, allyl 2-ethylhexoate, allyl methyl ether, allyl butyl ether and allyl octyl ether.

The allyl ethers can be either the allyl ethers of monohydric or polyhydric alcohols, although the ethers of monohydric alcohols are preferred. The preparation of these ethers is well known, merely involving the reaction between an allyl halide and a sodium alcoholate. Thus, for example, allyl methyl ether, methallyl butyl ether, allyl amyl ether, allyl heptyl ether, methallyl octy ether, allyl lauryl ether, allyl hexadecyl ether, methallyl octadecyl ether and the like can be used.

Illustrative of the allyl esters are allyl acetate, allyl propionate, allyl butyrate and allyl caproate. It is not necessary that single acids be used since mixtures of saturated and unsaturated monocarboxylic acids can be used to prepare the allyl esters.

Derivatives of the vinyl compounds, or substituted vinyl compounds, which can be used herein, include: halogen-substituted materials such as chlorostyrene; alkoxy-substituted materials such as p-methoxy styrene; and alkyl-substituted materials such as alpha-methyl styrene. As will be noted from the character of the foregoing typical substituted vinyl compounds, substituted groups which can be present are those which do not interfere with the course of the copolymerization with the aforesaid acids or anhydrides. In other words, a substituent group which can be present in the vinyl compound is one which is substantially inert or unreactive in the copolymerization. The substituent group, however, generally modifies the character of the final metal soap products; yet, in all cases, the metal soaps are characterized by satisfactory solubility and gelling character. In connection with divinyl benzene, divinyl naphthalene and the like, which can be used as modifiers in small amounts (e. g., 1–5 per cent) as vinyl compounds, it should be noted that these particular compounds are characterized by a high degree of reactivity in view of the two vinyl groups.

It will be understood, of course, that mixtures of the aforesaid vinyl compounds, can be used in place of the individual reactant. Similarly, mixtures containing substantial, and preferably, major proportions of one or more of said vinyl compounds can be used. Examples of such mixtures are: a crude styrene containing ethyl benzene, and a crude butylene containing butanes.

Particularly preferred herein of the vinyl compounds, in view of their availability, high reactivity and relatively low cost, are: styrene and vinyl acetate.

B. ALPHA, BETA UNSATURATED ALIPHATIC POLYCARBOXLIC ACIDS

Of the alpha, beta unsaturated aliphatic polycarboxylic acids the dicarboxylic acids are preferred. Illustrative of the preferred dicarboxylic acids are maleic, fumaric, itaconic, glutaconic, mesaconic and citraconic, and the tri-carboxylic aconitic acid. Of these, maleic acid in the form of its anhydride is particularly preferred at this time because of its ready availability, cost and because it is highly reactive. It will be recognized by those skilled in the art that the anhydrides of the acids or the acid halides as well as the acids having less than ten carbon acids per se can be used although generally it is preferred to use the anhydrides in the preparation of the copolymers.

C. CATALYSTS

Suitable catalysts for the copolymerization of a vinyl compound and an alpha, beta acid of the character described above, are organic peroxides such as benzoyl peroxide, di-tertiary-butyl peroxide, and lauroyl peroxide, and the hydroperoxides such as cumene hydroperoxide. These latter catalysts are somewhat less effective than the peroxides as catalysts in this reaction. While peroxides are most advantageous catalysts, any of the well-known polymerization catalysts can be used herein.

D. COPOLYMERIZATION CONDITIONS

The copolymerization of the aforesaid vinyl compounds and acids (or anhydrides) is accomplished by heating substantially equi-molar quantities of the reactants at temperatures within the range of about 75° C. to about 150° C. in the presence of about 0.1 to about 5.0 per cent of peroxide catalyst. Reaction time will vary from about a few minutes to several hours depending on temperature and mode of addition of peroxide. In the case of gaseous monomers, the reaction is run under pressure, e. g., 100–1000 pounds per square inch. The amount of peroxide catalyst required, of necessity, will vary with the type of vinyl compound used. Thus, for example, 0.5 to 1.0 per cent of peroxide catalyst is sufficient when a vinyl ester or vinyl ether is used; whereas, about 2.0 to about 3.0 per cent of peroxide catalyst is required when an alpha olefin or an allyl ester is used. The copolymerization can be carried out in the presence or absence of a solvent. Suitable solvents are toluene, xylene, dioxane, highly acid-refined mineral oil such as white oil and the like. For the purpose of commercial grease-making, the vinyl compound and the acid or anhydride can be copolymerized in a suitable pressure kettle, then the resulting copolymer can be converted to the corresponding partial ester or partial amide, and the latter thus obtained can be diluted with hot mineral oil of the required viscosity at the completion of the reaction with the alcohol or amide.

E. Structure of Acidic Copolymers

The structure of the acidic copolymers obtained from the vinyl compounds and acid or anhydride, has been acceptably established. In an article, "The Peroxide-Induced Copolymerization of Allyl Acetate with Maleic Anhydride," P. D. Bartlett and K. Nozaki, J. A. C. S. 68, pp. 1495–1504 (1946), the probable structure of the 1:1 copolymer of an aliphatic compound having a terminal vinyl group with an alpha, beta unsaturated aliphatic polycarboxylic acid, is represented by the following formula where the polycarboxylic acid is a dicarboxylic acid in the anhydride form:

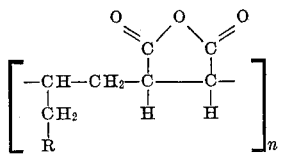

wherein R is the alkyl residue of an olefin, an allyl ester or an allyl ether, i. e., R is R', R'O and R'COO, and R' is an alkyl group or the alkyl residue of a vinyl ether or ester.

It has been found that the value of $n$ in the formula given above for the acidic copolymer is a large whole number. That is, the average molecular weight of the acidic copolymers from which the present gelation agents are prepared is about 1000 to about 100,000, and preferably about 5000 to about 50,000.

II. REACTION PRODUCTS OF ACIDIC COPOLYMERS WITH ALCOHOLS OR AMINES

A. Alcohols and Amines

As indicated above, the acidic copolymers are reacted with certain alcohols or with certain amines, and the reaction products thus obtained are converted, in turn, to their corresponding metal salts. It has been determined that from about fifty to about ninety per cent of the carboxyl groups of the acidic copolymers should be reacted with an alcohol or amine, the percentage varying with the individual alcohol or amine which is used. For example, a lower percentage of an alcohol or amine is required when a high molecular weight alcohol or amine is used. Thus, from about ten to about fifty per cent of the carboxyl groups of the acidic copolymer should be available for conversion to the corresponding metal salt groups.

It will be recognized that the acidic copolymers, when reacted with alcohols, are converted to esters; and, when reacted with amines, are converted to amides. Inasmuch as only a portion of the carboxyl groups of the acidic copolymers are so converted, the resulting products are partial esters and partial amides, respectively.

The alcohols and amines used herein are monohydric and monoamino in character, contain at least about eight carbon atoms per molecule, and are aliphatic. In general, primary aliphatic alcohols and amines containing from about ten to about eighteen carbon atoms per molecule are preferred. Representative compounds include: alcohols such as octyl, decyl such as n-decanol, dodecanols such as n-dodecanol, tetradecanols such as n-tetradecanol, hexadecanols such as n-hexadecanol, octadecanols such as n-octadecanol, oleyl alcohol, "Lorol 5" which contains a mixture of $C_{10}$ to $C_{18}$ alcohols; amines such as octyl, decylamines such as n-decylamine, dodecylamines such as n-dodecylamine, hexadecylamines such as n-hexadecylamine, octadecylamines such as n-octadecylamine and octadecenyl amine.

Particularly preferred herein of the alcohols is a mixture of $C_{10}$ to $C_{18}$ alcohols containing a predominant amount of $C_{12}$ alcohol; and of the amines is a mixture of $C_8$ to $C_{18}$ amines predominating in $C_{18}$ amines.

B. Reaction Conditions

Reaction of an acidic copolymer and an alcohol or amine is effected by heating regulated quantities thereof at a temperature from about 200 to about 300° F. for about 1–3 hours. As previously mentioned, the quantity of alcohol or amine so reacted is limited such that at least about fifty per cent of the carboxyl groups of the acidic copolymers are converted to the corresponding respective ester or amido group, and such that not more than about ninety per cent of the carboxyl groups are so converted. Reaction is aided by using a small amount, as one to two per cent based upon the quantity of copolymer and alcohol, of a catalyst such as sulfuric acid or paratoluene sulfonic acid. A solvent such as methyl ethyl ketone, toluene or xylene can also be used.

III. METAL SALT GELLING AGENTS

A. Metals

As has been stated hereinbefore, the novel gelation agents of this invention are metal salts of the above-described partial esters and partial amides. Suitable metals for the preparation of these gelling agents are the members of groups I to IV of Mendeleeff's periodic system. In general, salts of the metals of groups I, II and III of such system, including lithium, calcium, barium and aluminum salts are preferred. Other typical metals are: sodium, potassium, magnesium, zinc, strontium, indium, tin, lead and titanium.

B. Reaction Conditions

Any of the standard methods for the preparation of salts of organic acids can be used. For example, the partial ester or partial amide can be neutralized with the hydroxide or alcoholate of the metal desired or the alkali metal or ammonium salt of the partial ester or partial amide can be reacted with the chloride, hydroxide, carbonate or other salt of the metal the final salt of which is sought. As a general but by no means sole procedure, about ten to about twenty-five per cent of the partial ester or partial amide is blended in a mineral oil of suitable viscosity, the amount of metal hydroxide or oxide required to neutralize all of the carboxyl groups of the partial ester or partial amide is added to the blend and the mixture is heated, while agitating the same, to about 300° F. to about 500° F. The mixture is held in this temperature range for about one-half to about three hours. The resulting grease is cooled with or without agitation in a grease kettle or drawn off into pans to cool.

C. Structure

In the light of the foregoing it is manifest that the salts of the aforesaid partial esters and partial amides will have obvious but various structures dependent upon such factors as: (1) the valence of the metal of the salt, (2) the presence of more than one acidic component in the reaction mixture during the formation of the salt and (3) the presence and valence of more than one metal in the reaction mixture during the formation of the salt. Thus, by way of illustration, when making the salt of a monovalent metal and a mixture of partial esters, the resulting gelation agent will be a mixture of monovalent metal salts of the various partial esters. Such a mixture can contain, for example, the following salt derived from a partial ester:

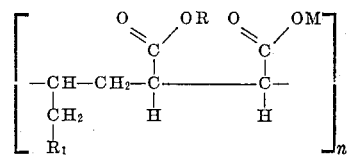

wherein R and $R_1$ are alkyl

Correspondingly, a mixture can contain the following salt derived from an amine:

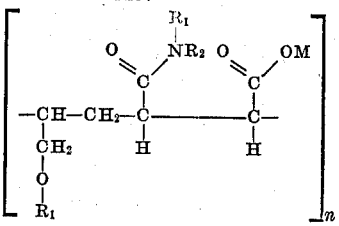

wherein $R_1$ is alkyl and $R_2$ is hydrogen or alkyl

In the foregoing formulae, M is the same or different monovalent metal of group I, and $n$ is as described above. It will be recognized, of course, that when polyvalent metals of groups I to IV are used the resulting gelation agents are more complex since there can be cross linking of partial ester (or partial amide) units of separate copolymer chains through the polyvalent metal as well as simple neutralization of carboxylic acid groups of two partial ester or amide units of the same copolymer chain by one atom of divalent metal. The probable structures of the components of a gelation agent prepared from a trivalent metal such as aluminum are even more diverse. Therefore, it will be understood that the present gelation agents can be of simple components or a plurality of components dependent upon the presence of: (1) one or more metals of single valence, (2) one or more partial esters and/or partial amides, (3) a polyvalent metal and one or more partial esters and/or partial amides, and (4) a plurality of mono- and/or polyvalent metals and a plurality of partial esters and/or partial amides.

Thus, greases containing, for example, a lithium-barium salt of a partial ester or a lithium salt of one partial ester and a barium salt of a second partial ester, can be prepared.

It has also been found that greases having a smooth texture can be prepared by converting a mixture of a partial ester (or partial amide) and a fatty acid to metal salts thereof in the oleaginous vehicle. Mixtures of a partial ester (or partial amide), a high molecular weight fatty acid and a low molecular weight fatty acid, can also be converted to their corresponding metal salts, thereby making available excellent greases of smooth texture. For example, a mixture of a partial ester and a fatty acid such as stearic or hydrogenated fish oil fatty acids can be used; so too can a mixture of a partial ester, a high molecular weight acid such as stearic or hydrogenated fish oil fatty acids and a low molecular weight fatty acid containing less than about six carbon atoms, preferably acetic acid. Fatty acids suitable for such purposes are the individual fatty acid or mixtures of fatty acids or hydroxy fatty acids having about ten to about twenty-two carbon atoms in the molecule, such as capric, lauric, stearic, hydroxy-stearic and hydrogenated fish oil fatty acids. The partial ester (or partial amide) and fatty acid are reacted with a single metal compound or a plurality of compounds of a plurality of metals of groups I to IV.

D. METHOD OF PREPARATION

A general over-all procedure for preparing the gelling agents and greases of this invention is the following: Maleic anhydride and a vinyl compound are copolymerized in the presence of an organic peroxide, and in a solvent such as toluene. An alcohol or amine is added to the reaction mixture, and the resulting mixture is heated in order that a partial ester or partial amide be formed. The mixture thus obtained is dissolved in a quantity of mineral oil such that the metal gelling agent will be present in the oil in the desired concentration, e. g., fifteen to twenty per cent by weight. The hydroxide of the desired metal, in an amount based upon the acidity of the partial ester or partial amide, is added and the resulting reaction mixture is heated in order to form the gelling agent (or soap) and grease.

IV. ILLUSTRATIVE EXAMPLES

Several illustrative but non-limiting examples of some specific gelling agents and greases containing the same are set forth below.

EXAMPLE I

Ten parts by weight of a styrene-maleic anhydride copolymer (kinematic viscosity of a ten per cent solution in methyl ethyl ketone, 3.53 centistokes at 77° F.) were dissolved in 100 parts by weight of methyl ethyl ketone, and 13.5 parts by weight of n-octadecanol were added. The resulting solution was heated at reflux (about 185° F.) for one hour. The solvent was gradually distilled off and was replaced with xylene, which was added gradually. The temperature of the reaction mixture was finally raised to 280° F. (elapsed time, about one hour), and was kept at 280° F. for one hour. Xylene was then removed by distillation. The resulting resinous product had a neutralization number of 114.0, which indicates that the product is substantially the half ester of the n-octadecanol and the styrene-maleic anhydride copolymer. The partial half ester has a theoretical neutralization number of 120.0.

Four parts by weight of the partial ester were dissolved in twelve parts by weight of an acid-refined naphthenic oil having a viscosity of 232 S. U. S. at 100° F., and ten parts by weight of a solvent-refined naphthenic oil having a viscosity of 514 S. U. S. at 100° F. Three tenths part by weight of $Ca(OH)_2$ was added to the oil and the resulting mixture was stirred and was heated to 320° F. (during one-half hour) and kept at 320° F. for one hour. The resulting gel was cooled and milled to a smooth grease. The grease contained about 15.4 per cent of soap.

EXAMPLE II

Sixty parts by weight of styrene and 40.0 parts by weight of maleic anhydride were dissolved in 900 parts by weight of toluene. The resulting solution was heated to 150° F. and 1.0 part by weight of benzoyl peroxide was added. Heating was continued to about 200° F. where reaction took place as evidenced by clouding of the solution. Heating at reflux (about 220° F.) was continued for one hour. Ninety-eight parts by weight of lorol 5 alcohol (a mixture comprising 2.8% n-decanol, 61.0% n-dodecanol, 21.0% n-tetradecanol, 11.0% n-hexadecanol and 2.2% n-octadecanol) and 3.96 parts by weight of para-toluene sulfonic acid were added. The mixture was heated at reflux for about 2 hours after which the solvent was removed by distillation. The resinous partial ester had a neutralization number of 123.0 (theoretical value, 144 N. N.).

Eighty parts by weight of the partial ester from above, 450.0 parts by weight of a solvent-refined naphthenic oil having a viscosity of 514 S. U. S. at 100° F., 6.5 parts by weight of $Ca(OH)_2$ and 10 parts by weight of water were mixed in a suitable grease kettle and heated to 335° F. over a four hour period. The grease was cooled to room temperature while stirring. The final soap concentration was 15.6 per cent.

EXAMPLE III

Eighty parts by weight of a partial ester (N. N., 101) of a styrene-maleic anhydride copolymer and n-octadecanol, prepared in the same manner as the partial ester described in Example II, 360 parts by weight of a solvent-refined naphthenic oil having a viscosity of 514 S. U. S. at 100° F., 23 parts by weight of $Ba(OH)_2.8H_2O$ and 10 parts by weight of water were mixed in a grease kettle and heated to 350° F. during a four hour period, and were maintained at 350° F. for a one hour period. The resulting grease was then stirred while it was cooled to room temperature (about 70–80° F.). The soap concentration of the grease was twenty per cent.

EXAMPLE IV

Seventy-three and one-half parts by weight of styrene, 49 parts by weight of maleic anhydride and 1.23 parts by weight of benzoyl peroxide were reacted at 150–220° F. for one hour, in 1000 parts by weight of toluene as described in Example II, above. The styrene-maleic anhydride copolymer thus formed was partially esterified with a mixture of 93.6 parts by weight of Lorol 5 alcohol and 9.9 parts by weight of n-octadecanol, using 4.54 parts of paratoluene sulfonic acid as catalyst, at 300° F. for two hours. The resulting partial ester had a neutralization number of 121.0.

Eighty parts by weight of the partial ester from above, 371 parts by weight of an acid-refined naphthenic oil (232 S. U. S. at 100° F.) and 8.7 parts by weight of $LiOH.H_2O$ dissolved in 78.0 parts by weight of water, were mixed in a suitable grease kettle and heated to 400° F. over a four hour period. The resulting grease was stirred while cooling to room temperature (80° F.). The soap concentration was 18.0 per cent.

Example V

Twenty-eight parts by weight of a propylene-maleic anhydride copolymer, 48 parts by weight of Lorol 5 alcohol and 1 part by weight of paratoluene sulfonic acid were reacted in 500.0 parts by weight of dioxane, as described in Example I to form a partial ester of the copolymer having a neutralization number of 137.0.

Six parts by weight of the above partial ester, 24 parts by weight of an acid-refined naphthenic oil, 2.66 parts by weight of Ba(OH)$_2$.8H$_2$O and 2.0 parts by weight of water, were mixed and heated to 400° F. over a one and one-half hour period. The resulting grease was stirred while cooling to room temperature. The grease contained 22.0 per cent soap.

Example VI

Forty-three parts by weight of freshly distilled vinyl acetate and 49.0 parts by weight of maleic anhydride were copolymerized in 700 parts by weight of dioxane using 1.0 part by weight of benzoyl peroxide as catalyst at 150° F. for ten minutes. The resulting copolymer was partially esterified with a mixture of 120 parts by weight of Lorol 5 alcohol and 27 parts by weight of n-octadecanol, at 200° F. for six hours, then to 350° F. for one-half hour, as described in Example I. The partial ester had a neutralization number of 102.0.

Six parts by weight of the above partial ester, 24 parts by weight of a solvent-refined naphthenic oil, 2 parts by weight of Ba(OH)$_2$.8H$_2$O and 2 parts by weight of water were mixed and heated to 400° F. over a one and one-half hour period. The resulting grease was stirred while cooling to room temperature. The soap content was 22.0 per cent.

Example VII

Fifty parts by weight of vinyl n-butyl ether and 49.0 parts by weight of maleic anhydride were copolymerized in 800 parts by weight of toluene using 1.0 part by weight of benzoyl peroxide as catalyst at 150° F. for one-half hour. The resulting copolymer was then partially esterified with a mixture of 120.0 parts by weight of Lorol 5 alcohol and 27.0 parts by weight of n-octadecanol, as described in Example I. The resulting partial ester had a neutralization number of 84.0.

Four and one-half parts by weight of the above copolymer, 25.5 parts by weight of said acid-refined naphthenic oil, and 0.7 part by weight of aluminum isopropoxide were mixed and heated to 300° F. over a one hour period. The clear grease was cooled statically to room temperature and then milled to a clear, soft grease. The soap content was 15.0 per cent.

Example VIII

Two parts by weight of a styrene-maleic anhydride copolymer, 3.2 parts by weight of Armeen HT (mixture of 25.0% n-hexadecylamine, 70.0% n-octadecylamine and 5.0% n-octadecenylamine, marketed by Armour and Company) and 20.0 parts by weight of said acid-refined naphthenic oil, were mixed and heated to 300° F. for two hours to form a partial amide of the copolymer. The solution was cooled to about 200° F. Two parts of water and 1.26 parts of Ba(OH)$_2$.8H$_2$O were added and the mixture was heated to 450° F. over a two hour period. The resulting grease was stirred while cooling to room temperature and then milled to a smooth, clear grease. The soap content was 20.0 per cent.

Example IX

Forty parts by weight of "Hydrofol" Acids 150 (mixture of 0.5% myristic, 17.7% palmitic, 77.6% stearic, 1.0% arachidic and 3.2% oleic marketed by Archer-Daniels-Midland Company), 66.6 parts by weight of a partial ester of a styrene-maleic anhydride copolymer, similar to that described in Example II, 574.0 parts by weight of said acid-refined naphthenic oil and 44.0 parts by weight of Ba(OH)$_2$.8H$_2$O were mixed in a suitable grease kettle and heated to 350° F. over a four and one-half hour period. The resulting grease was cooled to room temperature and milled. The soap content was 18.0 per cent.

Example X

Thirty parts by weight of "Hydrofol" Acids 150, 50.0 parts by weight of a partial ester of a styrene-maleic anhydride copolymer, similar to that described in Example II, 4.4 parts by weight of acetic acid, 44.7 parts by weight of Ba(OH)$_2$.8H$_2$O and 415.0 parts by weight of said acid-refined naphthenic oil were mixed and heated to 360° F. over a three hour period. The resulting grease was stirred while cooling to room temperature and cut back with oil (72 parts by weight) to 18 per cent soap concentration.

In general, the greases of this invention are characterized by high dropping points, which fact indicates their use for high temperature applications. The dropping points of the grease described are listed in the following table.

*Table I*

| Grease: | Dropping point, °F.[1] |
| --- | --- |
| Example I | 500+ |
| Example II | 375 |
| Example III | 400+ |
| Example IV | 280 |
| Example V | 450+ |
| Example VI | 400+ |
| Example VII | 308 |
| Example VIII | 426 |
| Example IX | 414 |
| Example X | 415+ |

[1] A. S. T. M. Designation: D 566-42

It is seen that most of the greases shown in Table I have dropping points above 400° F.

V. OIL VEHICLES

The oil vehicles or oleaginous vehicles of the greases of this invention can vary considerably in character. In general, mineral oils used are those characterized by a viscosity (S. U. V.) of greater than about 40 seconds at 100° F., preferably from about 60 to about 6000 seconds at 100° F. In place of all or part of the mineral oil component, other oils of lubricating viscosity can also be used. Such oils include synthetic vehicles comprising polymerized olefins, esters of aliphatic dibasic acids, esters of polyalcohols and monocarboxylic acids, silicones, silicate esters, esters of phosphorous-containing acids, fluorocarbons, etc. Typical of such synthetic oils are: polypropylene, polypropylene glycol, di-(2-ethyl hexyl) sebacate, di-(2-ethyl hexyl) adipate, dibutyl phthalate, polyethylene glycol di-(2-ethyl hexoate), polymethylsiloxane. The synthetic vehicles are most suitable for providing greases for use in aircraft, since many of such greases retain their lubricating value over a wide temperature range, from about −100° F. to about 500° F.

VI. CONCENTRATION OF GELLING AGENT

The gelation agents are generally used in amounts ranging from about 5 to about 50 per cent by weight of the finished grease composition, depending upon the consistency desired and the purpose for which the grease is designed. The concentration of such agent or soap will also vary with the type of soap and the composition and viscosity of the base oil. Preferably, however, the quantity of gelling agent will fall within the range of ten to twenty-five per cent by weight.

VII. MODIFYING AGENTS

It is to be understood that the greases of this invention can also contain other characterizing materials and fillers. For example, the greases can contain antioxidants such as amines (e. g., phenyl alpha-naphthylamine), phenols (e. g., 2-6-ditertiary butyl-4-methyl phenol), and the like; lubricity improving agents such as free fat, free fatty acids, esters of alkyl and/or aryl acids, sulfurized fats, lead soaps, etc. Typical fillers include carbon black, silica flour and colloidal clay. Other additives which can be present are: extreme pressure agents, such as a chloronaphtha xanthate; and tackiness agents such as polyisobutylenes.

VIII. UTILITY

The greases of this invention are suitable for a wide range of industrial applications. Some, for example, are suitable for use as multi-purpose automotive greases, serving as chassis, wheel-bearing, water-pump grease lubricants. Others are multi-purpose industrial greases serving as plain-bearing and anti-friction greases for normally loaded and heavily loaded equipment. In general, then, greases contemplated herein range from semi-fluid types suitable as textile machinery lubricants, to solid block type greases used in lubrication of machinery in steel mills, paper mills, cement mills, etc.

I claim:

1. A grease comprising an oleaginous vehicle and a salt in an amount sufficient to thicken said vehicle to form a grease, said salt being a metal salt of an acidic reaction product obtained by reaction of a compound selected from the group consisting of an aliphatic monohydric alcohol having at least about eight carbon atoms per molecule and an aliphatic monoamine having at least about eight carbon atoms per molecule, with an acidic copolymer of an alpha, beta unsaturated polycarboxylic acid and a low molecular weight organic compound having a terminal vinyl group and having less than about ten carbon atoms per molecule, such that from about fifty to about ninety per cent of the carboxyl groups of the acidic copolymer are reacted with said compound, said acidic copolymer having a molecular weight above about 1,000, the metal of said salt being selected from the group consisting of metals of groups I through III of Mendeleeff's periodic system.

2. A grease comprising an oleaginous vehicle, a salt (1) of a fatty acid having ten to twenty-two carbon atoms per molecule and a salt (2), in an amount sufficient to thicken said vehicle to form a grease, said salt (2) being a metal salt of an acidic reaction product obtained by reaction of a compound selected from the group consisting of an aliphatic monohydric alcohol having at least about eight carbon atoms per molecule and an aliphatic monoamine having at least about eight carbon atoms per molecule, with an acidic copolymer of an alpha, beta unsaturated polycarboxylic acid and a low molecular weight organic compound having a terminal vinyl group and having less than about ten carbon atoms per molecule, such that from about fifty to about ninety per cent of the carboxyl groups of the acidic copolymer are reacted with said compound, said acidic copolymer having a molecular weight above about 1,000, the metal of said salt being selected from the group consisting of metals of groups I through III of Mendeleeff's periodic system.

3. A grease comprising an oleaginous vehicle, a salt (1) of a fatty acid having ten to twenty-two carbon atoms per molecule, a salt (2) of a fatty acid having less than about six carbon atoms per molecule and a salt (3), in an amount sufficient to thicken said vehicle to form a grease, said salt (3) being a metal salt of an acidic reaction product obtained by reaction of a compound selected from the group consisting of an aliphatic monohydric alcohol having at least about eight carbon atoms per molecule and an aliphatic monoamine having at least about eight carbon atoms per molecule, with an acidic copolymer of an alpha, beta unsaturated polycarboxylic acid and a low molecular weight organic compound having a terminal vinyl group and having less than about ten carbon atoms per molecule, such that from about fifty to about ninety per cent of the carboxyl groups of the acidic copolymer are reacted with said compound, said acidic copolymer having a molecular weight above about 1,000, the metal of said salt being selected from the group consisting of metals of groups I through III of Mendeleeff's periodic system.

4. A grease as defined by claim 1 wherein the low molecular weight organic compound is an alpha olefin having less than about ten carbon atoms per molecule.

5. A grease as defined by claim 1 wherein the low molecular weight organic compound is styrene.

6. A grease as defined by claim 1 wherein the polycarboxylic acid is a dicarboxylic acid.

7. A grease as defined by claim 1 wherein the polycarboxylic acid is in anhydride form and is maleic anhydride.

8. A grease as defined by claim 1 wherein the monohydric alcohol is an aliphatic alcohol having from about ten to about eighteen carbon atoms per molecule.

9. A grease as defined by claim 1 wherein the monohydric alcohol is a mixture of aliphatic monohydric alcohols having from ten to eighteen carbon atoms per molecule and predominantly dodecanol.

10. A grease as defined by claim 1 wherein the monoamine is an aliphatic amine having from about ten to about eighteen carbon atoms per molecule.

11. A grease as defined by claim 1 wherein the monoamine is a mixture of aliphatic monoamines having from eight to eighteen carbon atoms per molecule and predominantly octadecylamine.

12. A grease as defined by claim 1 wherein the metal is an alkaline earth metal.

13. A grease as defined by claim 1 wherein the metal salt is present in an amount from about five to about fifty per cent by weight.

14. A grease as defined by claim 1 wherein the oleaginous vehicle is a mineral oil having a viscosity from about 100 to about 1000 S. U. S. at 100° F.

15. A grease comprising a mineral oil of lubricating viscosity and calcium salts in an amount sufficient to thicken said oil to form a grease, said salts being calcium salts of partial esters obtained by reaction of a mixture of aliphatic monohydric alcohols having from ten to eighteen carbon atoms per molecule and predominantly dodecanol with an acidic copolymer of styrene and maleic anhydride having a molecular weight above about 1,000, such that about fifty per cent of the carboxyl groups of the acidic copolymer are reacted with said alcohols.

16. A grease comprising a mineral oil of lubricating viscosity and a barium salt in an amount sufficient to thicken said oil to form a grease, said salt being a barium salt of a partial ester obtained by reaction of n-octadecanol with an acidic copolymer of styrene and maleic anhydride having a molecular weight above about 1,000, such that about fifty per cent of the carboxyl groups of the acidic copolymer are reacted with said alcohol.

17. A grease comprising a mineral oil of lubricating viscosity and barium salts in an amount sufficient to thicken said oil to form a grease, said salts being barium salts of partial esters obtained by reaction of a mixture of aliphatic monohydric alcohols having from ten to eighteen carbon atoms per molecule and predominantly dodecanol and octadecanol with an acidic copolymer of vinyl acetate and maleic anhydride having a molecular weight above about 1,000, such that about fifty per cent of the carboxyl groups of the acidic copolymer are reacted with said alcohols.

18. A grease comprising a mineral oil of lubricating viscosity, barium salts (1) of a mixture of fatty acids having from sixteen to twenty carbon atoms per molecule and predominantly stearic acid and a barium salt (2), in an amount sufficient to thicken said oil to form a grease, said barium salt (2) being a barium salt of partial esters obtained by reaction of a mixture of aliphatic monohydric alcohols having from ten to eighteen carbon atoms per molecule and predominantly dodecanol with an acidic copolymer of styrene and maleic anhydride having a molecular weight above about 1,000, such that about fifty per cent of the carboxyl groups of the acidic copolymer are reacted with said alcohols.

19. A grease comprising a mineral oil of lubricating viscosity, barium salts (1) of a mixture of fatty acids having from sixteen to twenty carbon atoms per molecule and predominantly stearic acid, barium acetate (2), and a barium salt (3), in an amount sufficient to thicken said oil to form a grease, said barium salt (3) being a barium salt of partial esters obtained by reaction of a mixture of aliphatic monohydric alcohols having from ten to eighteen carbon atoms per molecule and predominantly dodecanol with an acidic copolymer of styrene and maleic anhydride having a molecular weight above about 1,000, such that about fifty per cent of the carboxyl groups of the acidic copolymer are reacted with said alcohols.

References Cited in the file of this patent

UNITED STATES PATENTS

| Number | Name | Date |
|---|---|---|
| 2,564,561 | Carmichael | Aug. 14, 1951 |
| 2,615,845 | Lippencott et al. | Oct. 28, 1952 |
| 2,634,256 | Sparks et al. | Apr. 7, 1953 |
| 2,637,698 | Tutwiler | May 5, 1953 |